(12) United States Patent
An et al.

(10) Patent No.: US 12,331,785 B2
(45) Date of Patent: Jun. 17, 2025

(54) BEARING SEAL AND A BEARING WITH THE SAME

(71) Applicant: Aktiebolaget SKF, Gothenburg (SE)

(72) Inventors: Hongyuan An, Shanghai (CN); Yafen Chen, Shanghai (CN); He Zhu, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 161 days.

(21) Appl. No.: 17/898,766

(22) Filed: Aug. 30, 2022

(65) Prior Publication Data

US 2023/0072798 A1    Mar. 9, 2023

(30) Foreign Application Priority Data

Sep. 9, 2021   (CN) .......................... 202111056862.2

(51) Int. Cl.
*F16C 33/80*    (2006.01)
*F16C 33/66*    (2006.01)
*F16C 33/78*    (2006.01)

(52) U.S. Cl.
CPC ........ *F16C 33/805* (2013.01); *F16C 33/6618* (2013.01); *F16C 33/6655* (2013.01); *F16C 33/7826* (2013.01)

(58) Field of Classification Search
CPC .............. F16C 33/6618; F16C 33/6655; F16C 33/6681; F16C 33/6685; F16C 33/782; F16C 33/7826; F16C 33/80; F16C 33/805
See application file for complete search history.

(56) References Cited

U.S. PATENT DOCUMENTS

| 4,865,471 A | * | 9/1989 | Miyazaki | ............ F16C 33/7853 277/411 |
| 5,860,748 A | * | 1/1999 | Okumura | ............ F16C 33/7823 277/914 |
| 2017/0204908 A1 | * | 7/2017 | Ishii | ...................... F16C 33/785 |

FOREIGN PATENT DOCUMENTS

| JP | 2003166548 A | * | 6/2003 | |
| WO | WO-2017169976 A1 | * | 10/2017 | .............. F16C 19/06 |

OTHER PUBLICATIONS

Translation of JP-2003166548 obtained Apr. 3, 2024.*
Translation of WO2017169976 obtained Apr. 3, 2024.*

* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A bearing seal is suitable for sealing a space between a first rotating body and a second rotating body of a bearing. The first radial end of the bearing seal is arranged on the first rotating body and forms a contact seal with the first rotating body, the second radial end of the bearing seal is arranged close to the second rotating body and forms a non-contact seal with respect to the second rotating body. A plurality of lubricant storage cavities arranged on the inner surface of the bearing seal facing the rolling elements of the bearing. A bearing providing the bearing seal as described above.

12 Claims, 5 Drawing Sheets

BEARING SEAL AND A BEARING WITH THE SAME

CROSS-REFERENCE TO RELATED APPLICATIONS

This application claims priority to Chinese Patent Application no. 202111056862.2, filed Sep. 9, 2021, the contents of which is fully incorporated herein by reference.

TECHNICAL FIELD

The present disclosure relates to a bearing seal. The disclosure also relates to a bearing including the bearing seal.

BACKGROUND OF THE INVENTION

In the prior art, bearings are generally lubricated by lubricants. The agitation of lubricant from the inner and outer rings, the rolling elements and the cage of the bearing and centrifugal force will push the lubricant to move to the inner surface of the seal and the shoulder of the inner and outer rings, and make the lubricant finally leak out from the gap between the seal and the shoulder of the inner and outer rings under pressure. In addition, foreign pollutants will enter the bearing from the gap between the seal and the shoulder of the inner and outer rings, thus polluting the lubricant and reducing its service life.

SUMMARY OF THE INVENTION

In order to solve one or more defects in the prior art, according to one aspect of the present disclosure, a bearing seal is proposed, which is suitable for sealing the space between the first rotating body and the second rotating body of the bearing.

A first radial end of the bearing seal is arranged on the first rotating body and forms a contact seal with the first rotating body.

A second radial end of the bearing seal is arranged close to the second rotating body and forms a non-contact seal with respect to the second rotating body.

A plurality of lubricant storage cavities are arranged on the inner surface of the bearing seal facing the rolling elements of the bearing.

According to the above aspect of the present disclosure, the lubricant storage cavities are closer to the second radial end than the first radial end in a radial direction.

According to the above aspect of the present disclosure, the bearing seal has a seal base formed between the first radial end and the second radial end; the plurality of lubricant storage cavities are arranged on a base inner surface of the seal base facing the rolling elements at uniform intervals relative to each other along the circumferential direction of the seal base.

According to the above aspect of the present disclosure, the base inner surface of the seal base includes a base radial surface and a base inclined surface; the base incline surface is inclined toward the rolling elements located in the space; the plurality of lubricant storage cavities are provided on the base radial surface and the base inclined surface.

According to the above aspect of the present disclosure, along the circumferential direction of the seal base, each lubricant storage cavity has a pair of cavity side surfaces which are oppositely arranged; the lubricant storage cavity also has a cavity radial surface and a cavity inclined surface; the cavity radial surface and the cavity inclined surface are connected between the paired cavity side surfaces; the cavity incline surface is inclined toward the rolling elements located in the space.

According to the above aspect of the present disclosure, the bearing seal is provided with a seal reinforcement in the seal base; the seal reinforcement is in a form of L-shape; the seal reinforcement extends between the first radial end and the second radial end.

According to the above aspect of the present disclosure, the first radial end comprises a first radial end inner surface and a first radial end sealing lip; the first rotating body of the bearing comprises a first rotating body shoulder and a first recess arranged in the first rotating body shoulder; the first radial end inner surface abuts against the first rotating body shoulder and the first radial end sealing lip is arranged in the first recess by press-fitting; thereby restricting the movement of the first radial end in the direction of the central axis X of the bearing.

According to the above aspect of the present disclosure, the non-contact seal formed by the second radial end relative to the second rotating body is a labyrinth seal.

According to the above aspect of the present disclosure, the second radial end includes a second radial end first sealing lip extending toward the inside of the space, a second radial end second sealing lip extending toward the second rotating body, and a second radial end connecting portion connecting the second radial end first sealing lip and the second radial end second sealing lip; the second radial end first sealing lip, the second radial end second sealing lip and the second radial end connecting portion together form a second radial end U-shaped groove.

According to the above aspect of the present disclosure, the second rotating body of the bearing comprises a second rotating body first shoulder and a second rotating body second shoulder; the second rotating body first shoulder forms a step between the second rotating body second shoulders; a step groove is formed in the step; the second radial end second seal lip is clearance fit in the step groove; the second rotating body first shoulder is clearance-fitted in the second radial end U-shaped groove; there is a gap between the second radial end first sealing lip and the second rotating body first shoulder; there is a gap between the second radial end second sealing lip and the second rotating body second shoulder.

According to the above aspect of the present disclosure, the first rotating body is the outer ring of the bearing and the second rotating body is the inner ring of the bearing; or the first rotating body is the inner ring of the bearing and the second rotating body is the outer ring of the bearing.

According to another aspect of the present disclosure, a bearing is proposed, which includes a first rotating body, a second rotating body, and rolling elements disposed between the first rotating body and the second rotating body, wherein the bearing further includes the above-mentioned bearing seals respectively disposed on both sides of the bearing.

According to the present disclosure, under the condition that the lubricant is stirred by the inner and outer rings, rolling bodies and cages of the bearing and centrifugal force will push the lubricant to move to the inner surface of the seal and the shoulder of the inner and outer rings, a plurality of lubricant storage cavities evenly distributed on the inner surface of the seal will store part of the lubricant, which will reduce the pressure of the lubricant flowing out of the bearing, thus reducing the risk of lubricant leakage. When the raceway is short of lubricant, the lubricant stored in these lubricant storage cavities will be discharged into the raceway, so these cavities will become effective lubricant reservoirs. Therefore, the service life of the lubricant will be significantly prolonged.

According to the non-contact labyrinth seal of the present disclosure, the difficulty of lubricant flowing out from the gap between the second radial end and the second rotating body is increased, and the leakage of lubricant and the entry of foreign pollutants can be further reduced.

So far, in order that the detailed description of this disclosure can be better understood, and the contribution of this disclosure to the prior art can be better recognized, this disclosure has outlined the contents of this disclosure quite extensively. Of course, the embodiments of the present disclosure will be described below and will form the subject of the appended claims.

Likewise, those skilled in the art will realize that the concept on which this disclosure is based can be easily used as a basis for designing other structures, methods and systems for implementing several purposes of this disclosure. Therefore, it is important that the appended claims should be considered to include such equivalent structures as long as they do not exceed the spirit and scope of this disclosure.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Through the following drawings, those skilled in the art will have a better understanding of this disclosure, and the advantages of this disclosure can be more clearly reflected. The drawings described here are only for illustrative purposes of selected embodiments, not all possible embodiments, and are intended not to limit the scope of this disclosure.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The specific embodiments according to the present disclosure will be explained in detail with reference to the following figures.

Figure 1:
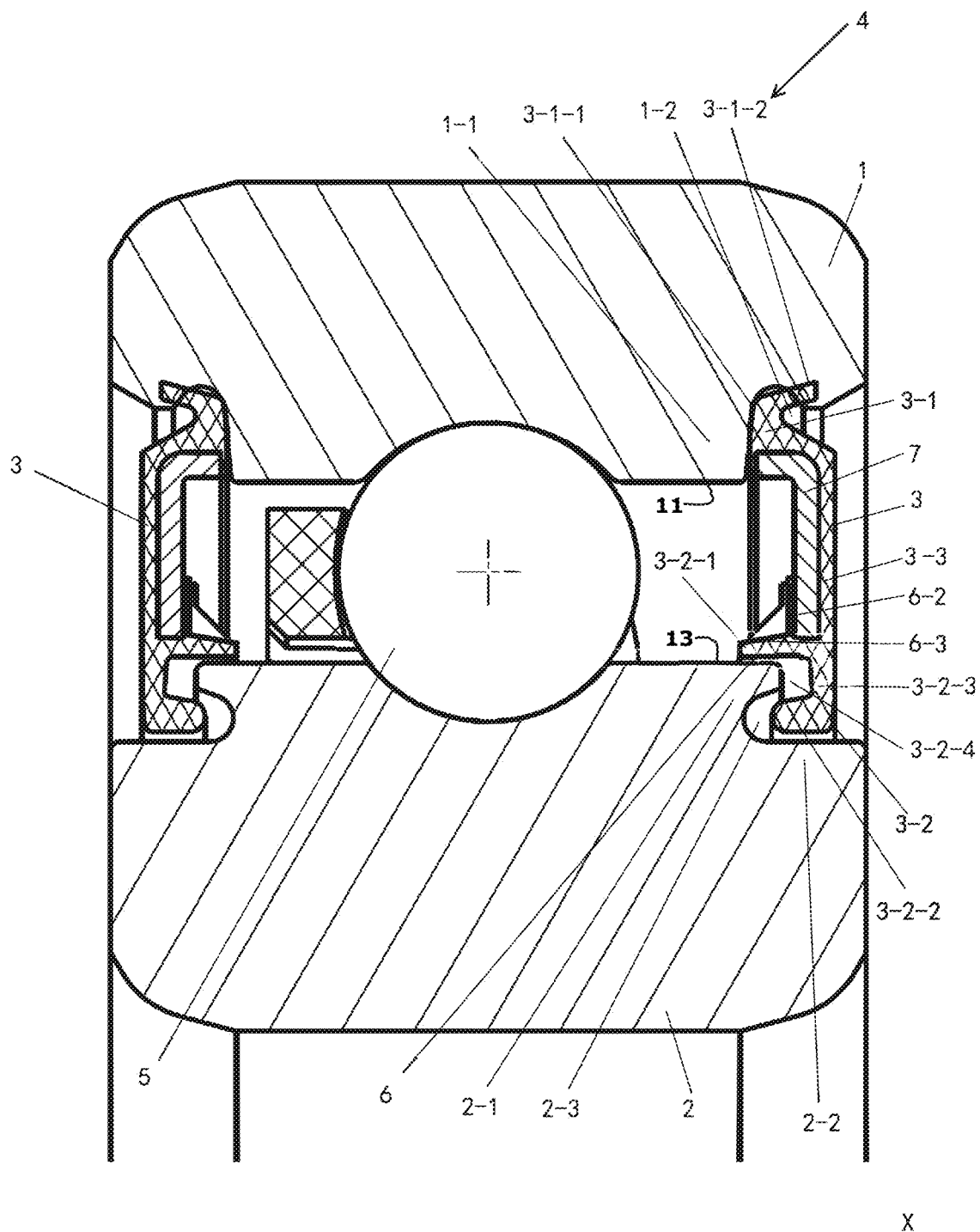
FIG. 1 shows a cross-sectional view of one embodiment of a bearing with a bearing seal according to the present disclosure.

FIG. 1 shows a cross-sectional view of one embodiment of a bearing 4 with a bearing seal 3 according to the present disclosure. This embodiment is the most preferred implementation of the technical scheme according to the present disclosure.

The bearing 4 has a central axis X.

The bearing seal 3 is suitable for sealing the space between a first rotating body 1 and a second rotating body 2 of the bearing 4, wherein the first rotating body 1 is an outer ring of the bearing 4 and the second rotating body 2 is an inner ring of the bearing 4.

A first radial end 3-1 of the bearing seal 3 is disposed on the first rotating body 1 and forms a contact seal with the first rotating body 1. The first rotating body has a radially innermost surface 11.

A second radial end 3-2 of the bearing seal 3 is disposed close to the second rotating body 2 and forms a non-contact seal with respect to the second rotating body 2. The second rotating body has a radially outermost surface 13.

A plurality of lubricant storage cavities 6 are provided on the inner surface of the bearing seal 3 facing the rolling elements 5 of the bearing 4.

For example, but not limited to, the bearing seal 3 is made of a composite material such as elastic rubber.

In FIG. 1, the lubricant storage cavities 6 are closer to the second radial end 3-2 in the radial direction than the first radial end 3-1.

As also shown in FIG. 1, the bearing seal 3 has a seal base 3-3 formed between the first radial end 3-1 and the second radial end 3-2.

Figure 2:
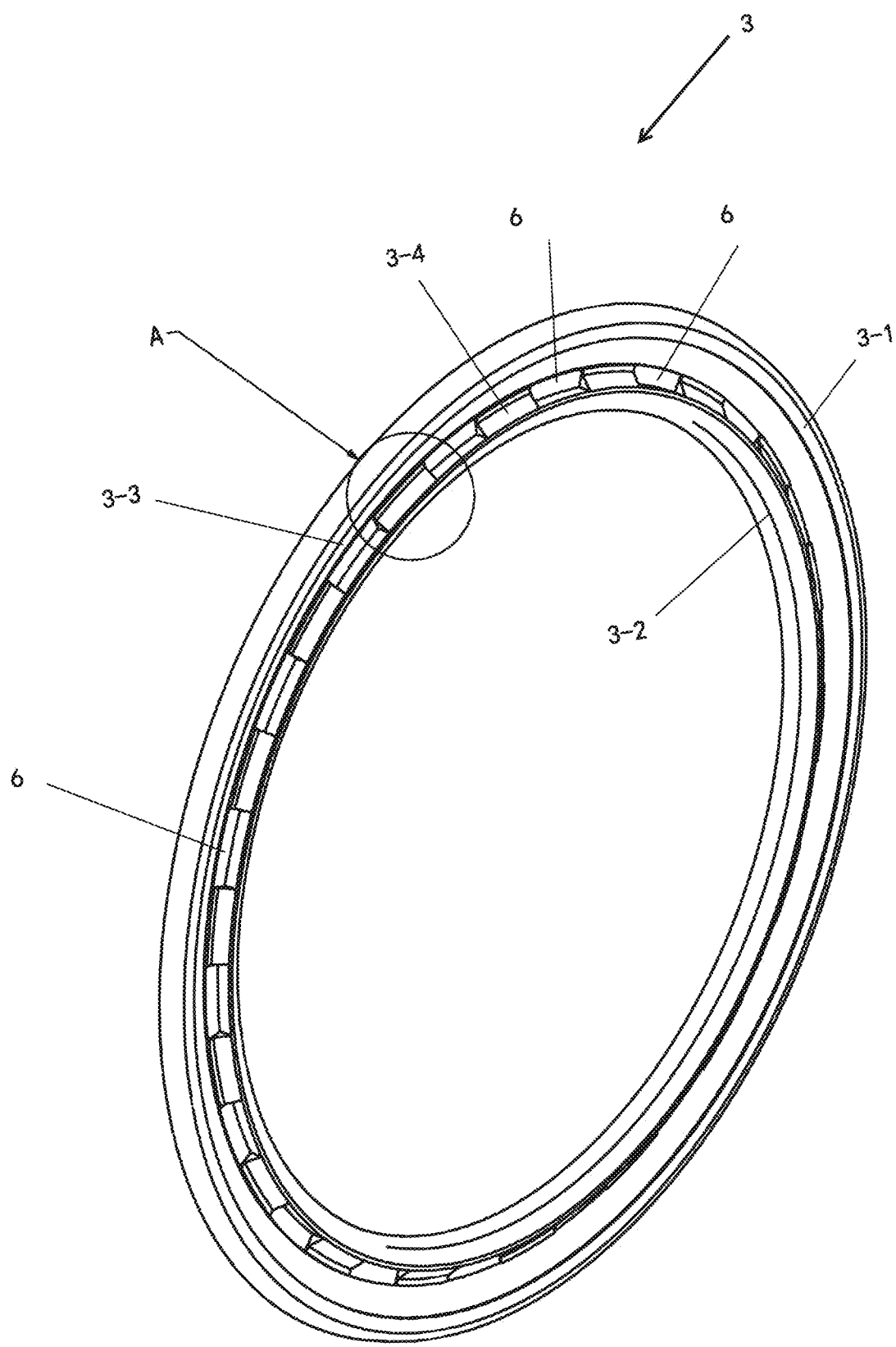
FIG. 2 shows a perspective view of a bearing seal according to the present disclosure.

FIG. 2 shows a perspective view of a bearing seal 3 according to the present disclosure, in which a plurality of lubricant storage cavities 6 are arranged at uniform intervals with respect to each other along the circumferential direction of the seal base 3-3 on a base inner surface 3-4 of the seal base 3-3 facing the rolling elements 5.

Figure 3:
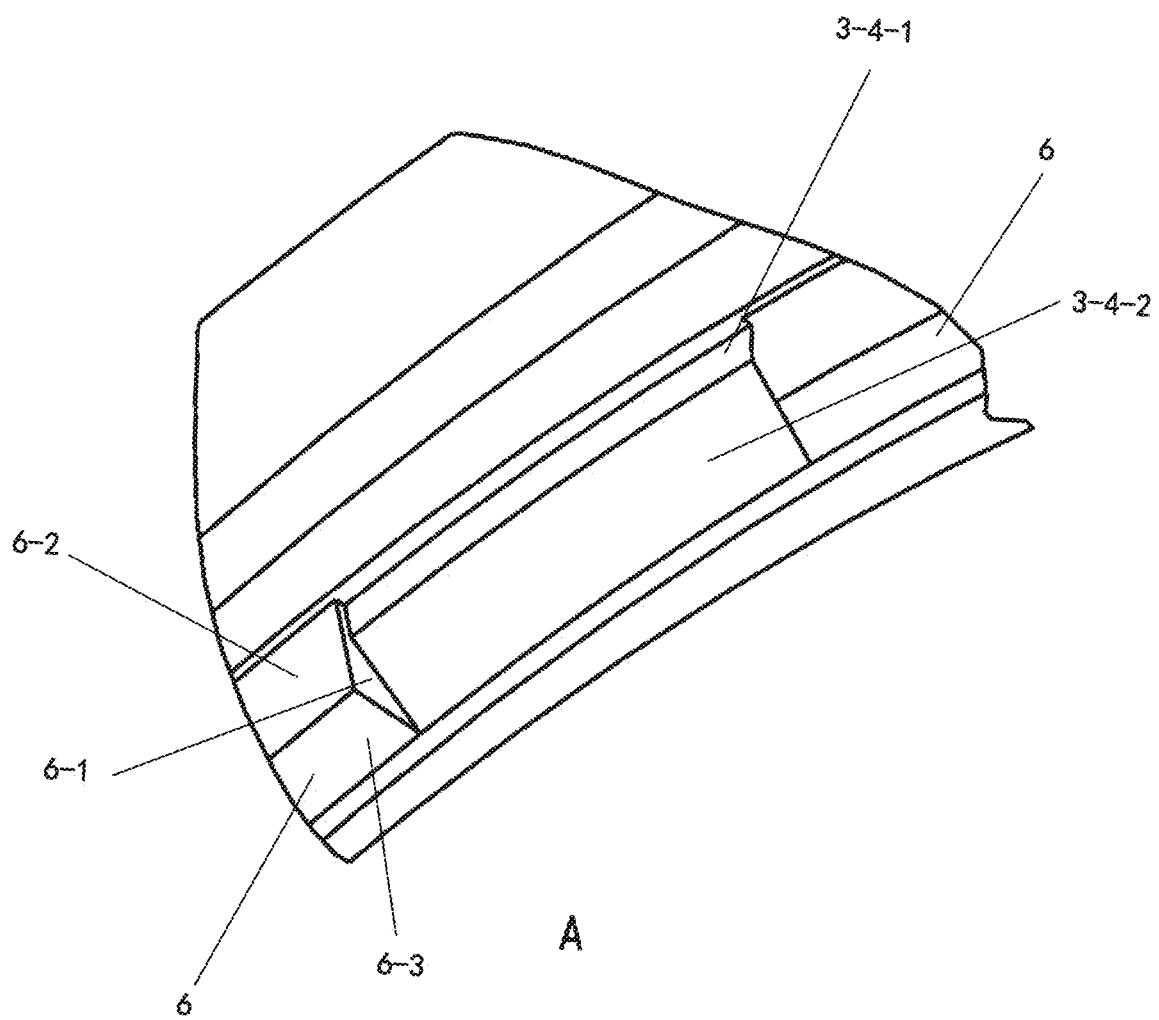
FIG. 3 shows an enlarged schematic diagram of part a in FIG. 2.

FIG. 3 shows an enlarged schematic diagram of section A in FIG. 2, wherein the base inner surface 3-4 includes a base radial surface 3-4-1 and a base inclined surface 3-4-2.

The base inclined surface 3-4-2 is inclined toward the rolling elements 5 located in the space.

A plurality of lubricant storage cavities 6 are provided on the base radial surface 3-4-1 and the base inclined surface 3-4-2, that is, the lubricant storage cavities 6 are recessed relative to the base radial surface 3-4-1 and the base inclined surface 3-4-2.

Along the circumferential direction of the seal base 3-3, each lubricant storage cavity 6 has a pair of cavity side surfaces 6-1 which are oppositely arranged (only one cavity side surface 6-1 is shown in FIG. 3).

The lubricant storage cavity 6 also has a cavity radial surface 6-2 and a cavity inclined surface 6-3.

The cavity radial surface 6-2 and the cavity inclined surface 6-3 are connected between the paired cavity side surfaces 6-1.

The cavity inclined surface 6-3 is inclined toward the rolling elements 5 located in the space.

The inclination of the cavity inclined surface 6-3 is much smaller than that of the base inclined surface 3-4-2.

Under the condition that the lubricant is stirred at high speed by the inner and outer rings, the rolling elements and the cage of the bearing and the centrifugal force will push the lubricant to move to the inner surface of the seal and the shoulder of the inner and outer rings, a plurality of lubricant storage cavities evenly distributed on the inner surface of the seal will store a part of the lubricant, which will reduce the pressure of the lubricant flowing out of the bearing, thus reducing the risk of lubricant leakage. When the moving speed of the bearing decreases, the lubricant stored in a plurality of lubricant storage cavities can flow back into the raceway of the bearing ring to lubricate again.

The bearing seal 3 is provided with a seal reinforcement 7 in the seal base 3-3.

The sealing reinforcement 7 is L-shaped.

The sealing reinforcement 7 extends between the first radial end 3-1 and the second radial end 3-2.

Figure 4:
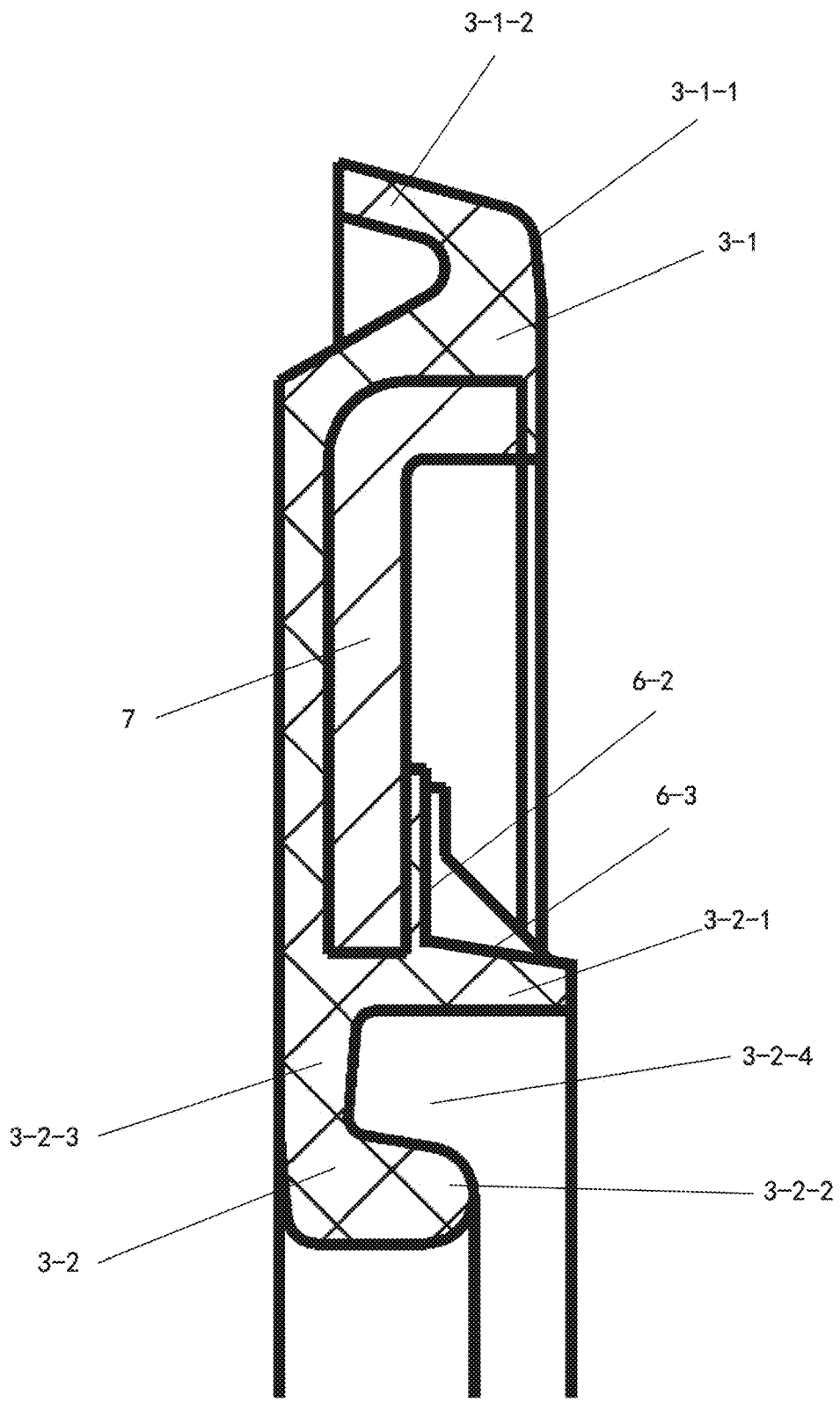
FIG. 4 shows a cross-sectional view of a bearing seal according to the present disclosure.

As shown in FIG. 4, the first radial end 3-1 includes a first radial end inner surface 3-1-1 and a first radial end sealing lip 3-1-2.

As shown in FIG. 1, the first rotating body 1 of the bearing includes a first rotating body shoulder 1-1 and a first recess 1-2 provided in the first rotating body shoulder 1-1.

In FIG. 1, the first radial end inner surface 3-1-1 abuts against the first rotating body shoulder 1-1 and the first radial end sealing lip 3-1-2 is arranged in the first recess 1-2 by press fitting, thereby restricting the movement of the first radial end 3-1 in the direction of the central axis X of the bearing.

The non-contact seal formed by the second radial end 3-2 relative to the second rotating body 2 is a labyrinth seal.

The labyrinth seal will be described in detail with reference to FIGS. 1 and 4, wherein the second radial end 3-2 includes a second radial end first sealing lip 3-2-1 extending toward the interior of the space, a second radial end second sealing lip 3-2-2 extending toward the second rotating body 2, and a second radial end connecting part 3-2-3 connecting between the second radial end first sealing lip 3-2-1 and the second radial end second sealing lip 3-2-2.

The second radial end first sealing lip 3-2-1, the second radial end second sealing lip 3-2-2 and the second radial end connecting part 3-2-3 together form a second radial end U-shaped groove 3-2-4.

As shown in FIG. 1, the second rotating body 2 of the bearing includes a second rotating body first shoulder 2-1 and a second rotating body second shoulder 2-2.

The second rotating body first shoulder 2-1 forms a step between the second rotating body second shoulders 2-2.

A step groove 2-3 is formed in the step.

The second sealing lip 3-2-2 of the second radial end is clearance-fitted in the step groove 2-3.

The first stop shoulder 2-1 of the second rotating body is clearance-fitted in the U-shaped groove 3-2-4 of the second radial end.

The second radial end U-shaped groove 3-2-4 and the stepped groove 2-3 can also play a role in storing lubricant, which will further reduce the pressure of lubricant flowing out of the bearing, thus further reducing the risk of lubricant leakage.

There is a radial gap between the second radial end first sealing lip 3-2-1 and the second rotating body first shoulder 2-1.

There is a radial gap between the second radial end second sealing lip 3-2-2 and the second rotating body second shoulder 2-2.

This non-contact labyrinth seal can further reduce the leakage of lubricant and the entry of foreign pollutants.

Figure 5:
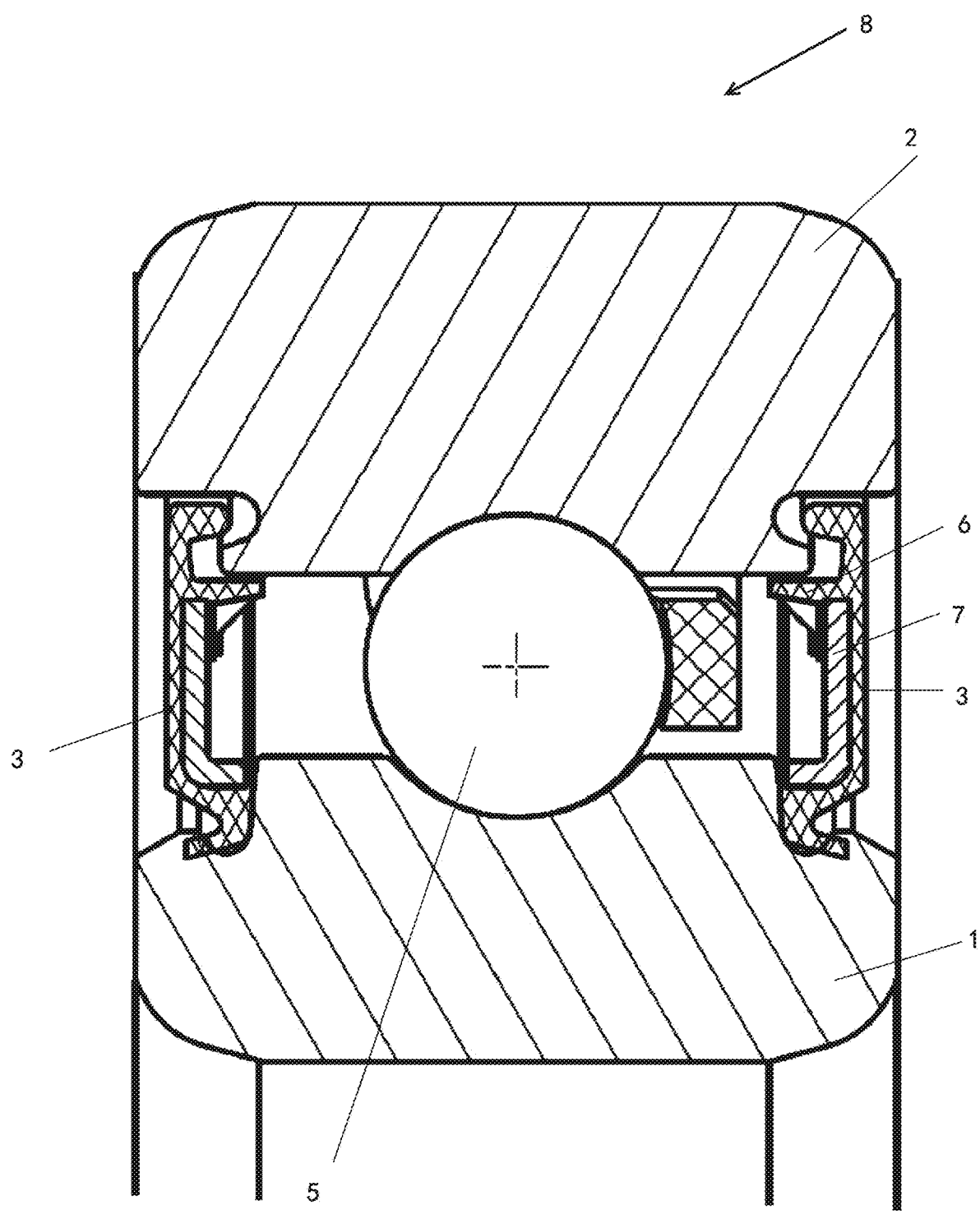
FIG. 5 shows a cross-sectional view of another embodiment of a bearing with a bearing seal according to the present disclosure.

FIG. 5 shows a cross-sectional view of another embodiment of a bearing with a bearing seal 3 according to the present disclosure, wherein the first rotating body 1 in the previous embodiment is the inner ring of the bearing 8 in this embodiment and the second rotating body 2 in the previous embodiment is the outer ring of the bearing 8 in this embodiment. The matching of the bearing seal 3 with the inner ring in this embodiment and the matching of the bearing seal 3 with the outer ring in the previous embodiment are identical; The matching of the bearing seal 3 with the outer ring in this embodiment and the matching of the bearing seal 3 with the inner ring in the previous embodiment are identical. This embodiment is a preferred embodiment according to the technical scheme of the present disclosure.

As shown in FIGS. 1 and 5, the bearings 4, 8 according to the above embodiment of the present disclosure include a first rotating body 1, a second rotating body 2, and rolling elements 5 disposed between the first rotating body 1 and the second rotating body 2, wherein the bearings 4 further include the bearing seals 3 disposed on both sides of the bearings 4, respectively.

The foregoing disclosure provides illustration and description, but it is not intended to be exhaustive or to limit the embodiments to the precise form disclosed. Modifications and variations can be made in light of the above disclosure, or can be acquired from the practice of the embodiments.

Even though specific combinations of features are recited in the claims and/or disclosed in the specification, these combinations are not intended to limit the disclosure of various embodiments. Actually, many of these features can be combined in ways not specifically stated in the claims and/or not specifically disclosed in the specification. Although each subordinate claim listed below may directly depend on only one claim, the disclosure of various embodiments includes each subordinate claim combined with each other claim in the claim set.

The invention claimed is:

1. A bearing with at least one bearing seal,
the at least one bearing seal is adapted to seal a space between a first rotating body and a second rotating body of the bearing with a plurality of rolling elements disposed therebetween,
wherein one of a group of the first rotating body and the second rotating body forms an inner ring having a radially outermost surface and the other of the group of the first rotating body and the second rotating body forms an outer ring having a radially innermost surface; and
wherein the at least one bearing seal comprises:
a first radial end that is arranged on the first rotating body and forms a contact seal with the first rotating body;

a second radial end that is arranged adjacent to the second rotating body and forms a non-contact seal with respect to the second rotating body; and a plurality of lubricant storage cavities that are arranged on an inner surface of the at least one bearing seal facing the plurality of rolling elements, the plurality of lubricant storage cavities being disposed between the radially outermost surface of the inner ring and the radially innermost surface of the outer ring, wherein at least one of the lubricant storage cavities is formed on a base inner surface of a seal base formed between the first radial end and the second radial end, the at least one of the lubricant storage cavities comprises:

a cavity base surface; and a cavity inclined surface, the cavity inclined surface being located between the radially innermost surface of the outer ring and the radially outermost surface of the inner ring.

2. The bearing with the at least one bearing seal according to claim 1, wherein the plurality of lubricant storage cavities are located closer to the second radial end than the first radial end in a radial direction.

3. The bearing with the at least one bearing seal according to claim 2, wherein the first radial end comprises a first radial end inner surface and a first radial end sealing lip; wherein the first rotating body of the bearing comprises a first rotating body shoulder and a first recess arranged in the first rotating body shoulder; and wherein the first radial end inner surface abuts against the first rotating body shoulder and the first radial end sealing lip is arranged in the first recess by press-fitting, thereby restricting the movement of the first radial end in the direction of a central axis of the bearing.

4. The bearing with the at least one bearing seal according to claim 2, wherein the non-contact seal formed by the second radial end relative to the second rotating body is a labyrinth seal.

5. The bearing with at least one bearing seal according to claim 1, wherein the at least one bearing seal is provided with a seal reinforcement in the seal base; wherein the seal reinforcement is L-shaped; and wherein the seal reinforcement extends between the first radial end and the second radial end.

6. The bearing with the at least one bearing seal according to claim 1, wherein the second radial end includes a second radial end first sealing lip that extends axially toward the plurality of rolling elements over a portion of the radially outermost surface of the inner ring or the radially innermost surface of the outer ring.

7. The bearing with the at least one bearing seal according to claim 1, further comprising a bearing seal having the same structure as the at least one bearing seal and located on an opposite side of the bearing from a side with the at least one bearing seal and facing the plurality of rolling elements.

8. A bearing seal, adapted to seal a space between a first rotating body and a second rotating body of a bearing with a plurality of rolling elements disposed therebetween, the bearing seal comprises:

a first radial end that is arranged on the first rotating body and forms a contact seal with the first rotating body;

a second radial end that is arranged adjacent to the second rotating body and forms a non-contact seal with respect to the second rotating body; and a plurality of lubricant storage cavities that are arranged on an inner surface of the bearing seal facing the plurality of rolling elements, wherein the plurality of lubricant storage cavities are located closer to the second radial end than the first radial end in a radial direction; and wherein the bearing seal has a seal base formed between the first radial end and the second radial end;

wherein the plurality of lubricant storage cavities are arranged on a base inner surface of the seal base at uniform intervals relative to each other along the circumferential direction of the seal base; and wherein the base inner surface of the seal base includes a base radial surface and a base inclined surface; and wherein the base inclined surface is inclined toward the plurality of rolling elements; and wherein the plurality of lubricant storage cavities are provided on the base radial surface and the base inclined surface.

9. A bearing seal, adapted to seal a space between a first rotating body and a second rotating body of a bearing with a plurality of rolling elements disposed therebetween, the bearing seal comprises:

a first radial end that is arranged on the first rotating body and forms a contact seal with the first rotating body;

a second radial end that is arranged adjacent to the second rotating body and forms a non-contact seal with respect to the second rotating body; and a plurality of lubricant storage cavities that are arranged on an inner surface of the bearing seal facing the plurality of rolling elements, wherein the plurality of lubricant storage cavities are located closer to the second radial end than the first radial end in a radial direction; and wherein the bearing seal has a seal base formed between the first radial end and the second radial end; wherein the plurality of lubricant storage cavities are arranged on a base inner surface of the seal base at uniform intervals relative to each other along a circumferential direction of the seal base; and wherein along the circumferential direction of the seal base, each lubricant storage cavity has a pair of cavity side surfaces which are oppositely arranged; wherein each lubricant storage cavity also has a cavity radial surface and a cavity inclined surface; wherein the cavity radial surface and the cavity inclined surface are connected between the paired cavity side surfaces; and wherein the cavity incline surface is inclined toward the rolling elements.

10. A bearing seal, adapted to seal a space between a first rotating body and a second rotating body of the bearing with a plurality of rolling elements disposed therebetween, the bearing seal comprises:

a first radial end that is arranged on the first rotating body and forms a contact seal with the first rotating body;

a second radial end that is arranged adjacent to the second rotating body and forms a non-contact seal with respect to the second rotating body; and a plurality of lubricant storage cavities that are arranged on an inner surface of the bearing seal facing the plurality of rolling elements, and wherein the plurality of lubricant storage cavities are located closer to the second radial end than the first radial end in a radial direction; and wherein the non-contact seal formed by the second radial end relative to the second rotating body is a labyrinth seal; and wherein the second radial end includes a second radial end first sealing lip extending toward the plurality of rolling elements and second sealing lip extending toward the second rotating body, and a second radial end connecting portion connecting the second radial end first sealing lip and the second radial end second sealing lip; wherein the second radial end first sealing lip, the second radial end second sealing lip and the second radial end connecting portion together form a second radial end U-shaped groove.

11. The bearing seal according to claim 10, wherein the second rotating body of the bearing comprises a second rotating body first shoulder and a second rotating body second shoulder; wherein the second rotating body forms a step between the second rotating body first shoulder and the second rotating body second shoulder; wherein a step groove is formed in the step; wherein the second radial end second sealing lip is clearance-fitted in the step groove; wherein the second rotating body first shoulder is clearance-fitted in the second radial end U-shaped groove; wherein there is a gap between the second radial end first sealing lip and the second rotating body first shoulder; and wherein there is a gap between the second radial end second sealing lip and the second rotating body second shoulder.

12. A bearing with at least one bearing seal, comprises
the at least one bearing seal is adapted to seal a space between a first rotating body and a second rotating body of the bearing with a plurality of rolling elements disposed therebetween,
wherein one of a group of the first rotating body and the second rotating body forms an inner ring having a radially outermost surface and the other of the group of the first rotating body and the second rotating body forms an outer ring having a radially innermost surface; and
wherein the at least one bearing seal further comprises:
a first radial end that is arranged on the first rotating body and forms a contact seal with the first rotating body;
a second radial end that is arranged adjacent to the second rotating body and forms a non-contact seal with respect to the second rotating body, the second radial end having a second radial end first sealing lip that extends axially toward the plurality of rolling elements over a portion of the radially outermost surface of the inner ring or the radially innermost surface of the outer ring; and
a plurality of lubricant storage cavities that are arranged on an inner surface of the at least one bearing seal facing the plurality of rolling elements, the plurality of lubricant storage cavities being disposed between the radially outermost surface of the inner ring and the radially innermost surface of the outer ring, wherein the plurality of lubricant storage cavities are arranged on a side of the second radial end first sealing lip that is radially opposite to a side thereof that faces the radially outermost surface of the inner ring or the radially innermost surface of the outer ring.

* * * * *